March 7, 1944.  E. F. ROSSMAN  2,343,478
SHOCK ABSORBER
Filed Feb. 12, 1943  3 Sheets-Sheet 1

INVENTOR
EDWIN F. ROSSMAN
BY
HIS ATTORNEYS

INVENTOR
EDWIN F. ROSSMAN

March 7, 1944.   E. F. ROSSMAN   2,343,478
SHOCK ABSORBER
Filed Feb. 12, 1943   3 Sheets-Sheet 3

INVENTOR
EDWIN F. ROSSMAN
BY
HIS   ATTORNEYS.

Patented Mar. 7, 1944

2,343,478

UNITED STATES PATENT OFFICE 2,343,478

SHOCK ABSORBER

Edwin F. Rossman, Dayton, Ohio, assignor to General Motors Corporation, Detroit, Mich., a corporation of Delaware Application February 12, 1943, Serial No. 475,600

10 Claims. (Cl. 188—88)

This invention relates to improvements in hydraulic shock absorbers and particularly to shock absorbers of the two-way, direct acting type.

It is among the objects of the present invention to provide a shock absorber adapted to control both the approaching and separating movements of two relatively movable members such as the frame and axle of a vehicle, the shock absorber being particularly adapted to provide a differential, two stage control of the approaching movement of the said members and a more constant control of their separating movement.

Further objects and advantages of the present invention will be apparent from the following description, reference being had to the accompanying drawings wherein a preferred embodiment of the present invention is clearly shown.

Figure 1:
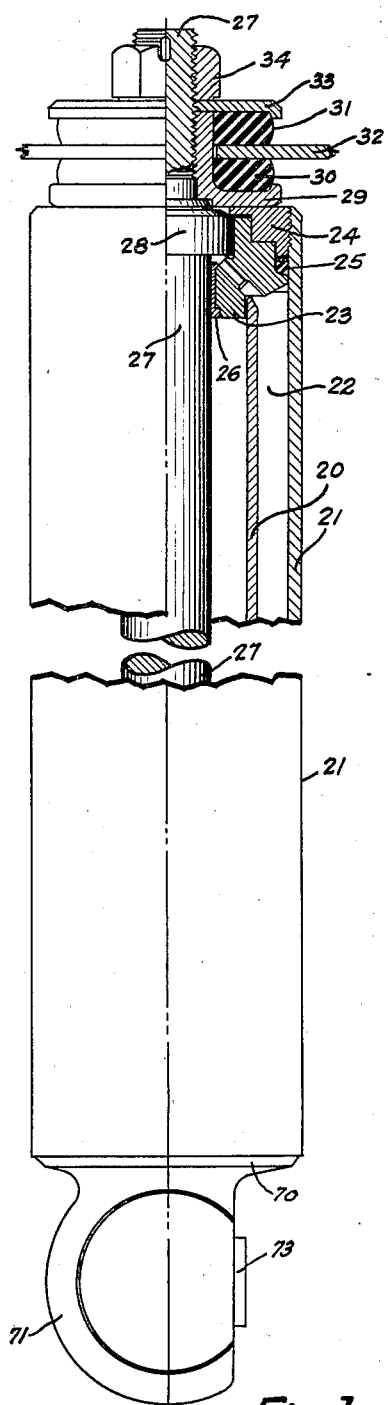
Fig. 1 is a fragmentary side view of the shock absorber in fully compressed position, a portion being shown in section to disclose interior construction. This view is half size.

Referring to the drawings the numeral 20 designates the working cylinder and 21 an outer tube concentric with the working cylinder and forming the fluid reservoir 22. The Fig. 1 shows the cylinder 20 provided with a head member 23 having two concentric annular portions one of which fits into the end of the cylinder 20 the other into the end of the outer tube 21 which is interiorly threaded to receive a clamping ring 24 fitting upon the head member to hold it in position. A sealing gasket 25 is clamped between the head member 23 and the ring 24 and presses against the interior annular surface of the tube 21. A central opening in the head member 23 supports a bearing sleeve 26 in which the piston rod 27 is slidably supported. This piston rod 27 extends through a packing box 28 of any suitable design which is supported in a recess of head member 23. The end of the piston rod 27, extending outside the packing box 28 as shown in Fig. 1, is screw threaded to receive a flanged collar 29 which supports two rubber grommets 30 and 31 between which the mounting bracket 32 is supported. This bracket 32 is adapted to be secured to one of the two relatively movable members whose movements the shock absorber is intended to control, in this instance the frame and axle of the vehicle. Grommet 31 is held against the bracket 32 by a collar 33 engaged by a nut 34 on the piston rod 27. Thus movement of the bracket 32 will slidably actuate the piston rod 27 in the bearing sleeve 26 and packing box 28.

Figure 6:
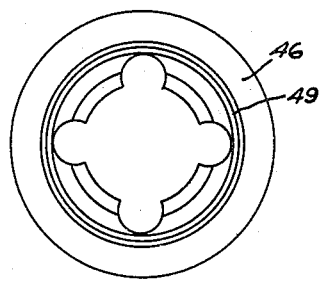
Fig. 6 is a detail view of one of the partition members forming a valve seat.
Figure 7:
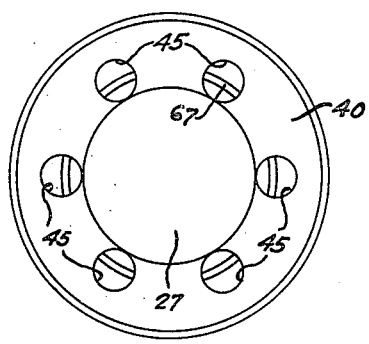
Fig. 7 is a detail view of the top of the piston taken in the direction of the arrow 7 of Fig. 3.
Figure 10:
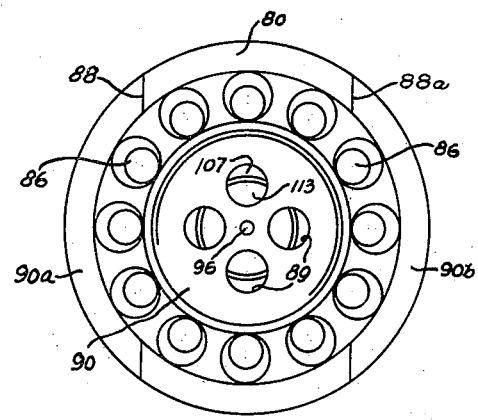
Fig. 10 is a similar view taken in the direction of the arrow 10 of Fig. 3.
Figure 8:
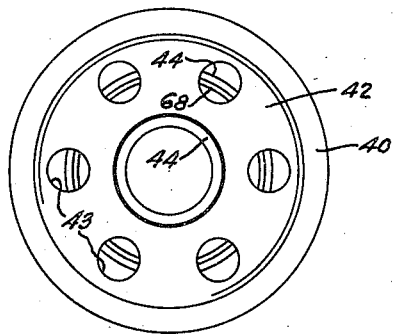
Fig. 8 is a similar view taken in the direction of the arrow 8 of Fig. 3.
Figure 9:
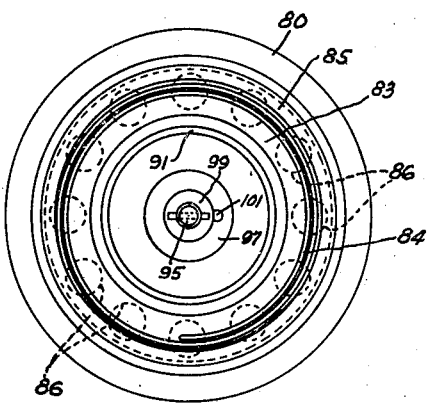
Fig. 9 is a detail view of the inner side of the lower cylinder end member taken in the direction of the arrow 9 of Fig. 3.

The piston rod 27 may be secured to or, as shown, may be integral with the piston 40 which is reciprocated in the working cylinder 20 by said rod. Piston 40 is recessed or hollowed out as at 41 the outer end of this recess being provided with screw threads to receive the clamping member 42 which has an annular row of openings 43 and a central opening in which the tubular body portion of a check valve 44 is slidably supported. In the head portion of the piston 40 an annular row of openings 45 is provided thus forming a passage in the piston through which fluid may be transferred from one side of the piston to the other as it is reciprocated in the cylinder 20. A ring shaped member 46 shown in section in Figs. 2 and 3 and in plan view in Fig. 6, fits in the piston recess 41 and is held clamped against the annular shoulder 47 in said piston recess by the clamping member 42. This ring shaped member 46 has an annular ridge on each flat surface thereof presenting oppositely disposed annular valve-seats 48 and 49. Not only the piston 40 is recessed but the piston rod 27 also as at 50. The annular edge formed by the juncture of recesses 41 and 50 is beveled as at 51 forming a valve-seat.

Figure 5:
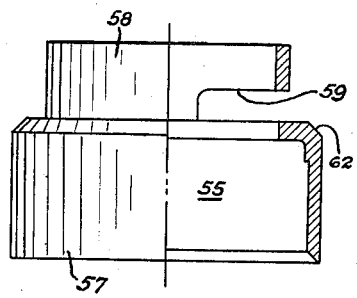
Fig. 5 is a detail view of another of the control valves.

The fluid passage in the piston, providing for the transfer of fluid from one side of the piston to the other as said piston is reciprocated in the cylinder, is normally closed by a compound valve mechanism comprising telescopically engaging, spring loaded valves 55 and 56. Valve 55 is detailedly illustrated by Fig. 5. It comprises a main, cylindrical body portion 57 greater in diameter than the recess 50 in the piston rod 27 and a tubular extension 58 adapted slidably to fit into said recessed rod. Adjacent the larger diameter body portion 57 the extension 58 has a slot 59 which is not sufficiently deep to reach the center of the valve. The inner annular edge of the body portion 57 of the valve 55 is beveled as at 62 said beveled surface being urged into engagement with the annular valve-seat 51 of the piston 40 by the spring 63 interposed between the valve 55 and the ring member 46. The valve member 56 is of tubular construction and telescopically engages the main body portion 57 of the valve 55. It has an outwardly extending, lower flange portion 66 which is yieldably maintained in engagement with the valve-seat ridge 48 on the ring 46 by a spring 67 interposed between valve 56 and the inner wall surface of the head of piston 40. Thus with valve 55 yieldably maintained upon its seat 51 and valve 56 upon its seat 48 and both valves 55 and 56 in telescopic engagement, the passage in the piston is normally closed.

Figure 2:
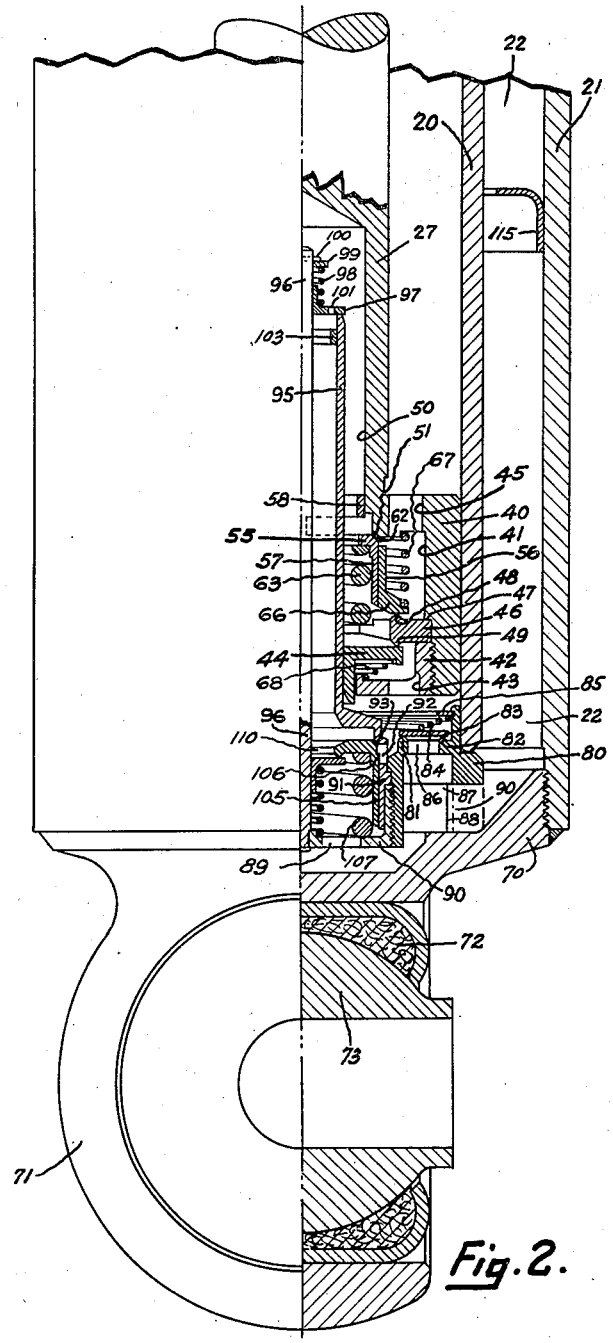
Fig. 2 is a full size, half elevational, half sectional view of the lower portion of the shock absorber when fully compressed.
Figure 3:
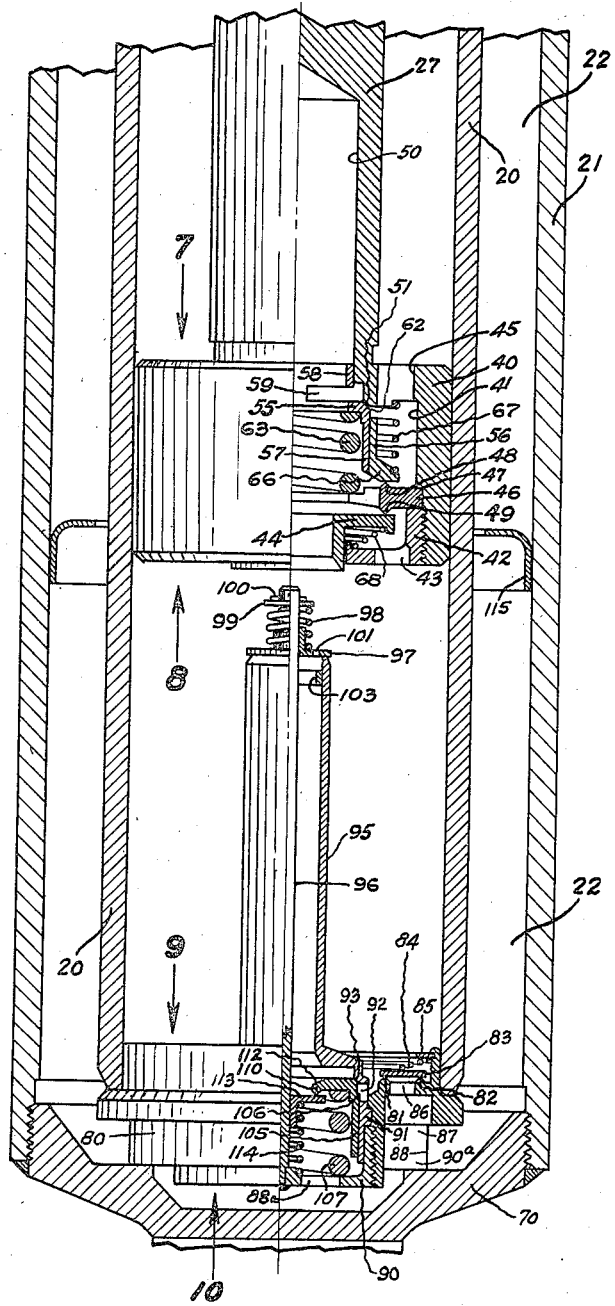
Fig. 3 is a fragmentary, full size sectional view showing the shock absorber piston in an intermediate position.

As shown in Figs. 2 and 3 of the drawings, spring 63 is of heavier construction than spring 67 so that a greater fluid pressure is required to move valve 55 from its seat 51 than that required to move valve 56 from its seat 48 and thus valve 55 will offer a greater restriction to the flow of fluid through the piston passage in one direction than will the valve 56 to fluid flow in the opposite direction. In fact the spring load on valve 56 is so calibrated that it will offer a minimum resistance to fluid flow through the piston passage 45 as said piston is moved downwardly in the cylinder 20, as regards Figs. 2 and 3, thus permitting a substantially free flow of fluid through the piston as it so moves. However, as the piston is actuated in the opposite direction or upwardly, fluid pressure, acting upon portion of the beveled edge 62 of valve 55 extending beyond the seat 51 on the piston and exposed to fluid pressure, will cause the valve 55, loaded by spring 63, to be moved from said seat and permit a restricted flow of fluid through the space so formed between beveled portion 62 of the valve and its seat 51 on the piston. The check valve 44 is urged into engagement with the annular valve-seat 49 on ring 46 by a spring 68 which is of comparatively light construction and therefore only a light fluid pressure is required to move the valve 44 from its seat 49.

The lower end of the tubular casing 21 receives a closure member 70 providing a head portion 71 which is hollowed out to receive a bearing 72 in which the ball end 73 of a connecting link is swivelly supported. The connecting link, not shown in the drawings, provides the means by which the shock absorber casing is secured to one of the two relatively movable members to be controlled, in this instance the axle of the vehicle.

Closure member 70 acts as a support for the end member 80 fitting into the lower end of the cylinder 20. Referring to Figs. 2, 3, 9 and 10 of the drawings, the end member 80 has two concentric ridges 81 and 82 forming spaced, annular valve-seats for the ring-shaped intake valve 83 which is urged upon said seats by spring 84 interposed between the intake valve 83 and a retainer ring 85 secured in the end member 80. A plurality of openings 86 arranged in a circular row provide communication between the annular space directly beneath the intake valve 83 and between its annular seats 81 and 82 and an annular recess 87 provided in the lower end of the end member 80. Two flat cutaways 88 and 88a on opposite sides of the lower portion of the end member provide openings 90a and 90b respectively which connect the recess 87 and openings 86 with the reservoir 22. As has been stated, valve 83 is an intake valve normally closed by the light spring 84 and permits fluid to flow from the reservoir into the cylinder but not from the cylinder into the reservoir.

The end member 80 has a central opening interiorly threaded to receive the clamping member 90 provided with a series of openings 89 arranged in a circular row. This clamping member 80 securely holds a cupshaped valve cage 91 in position in the end member 80. The annular wall of said valve-cage 91 has two diametrically opposite slots 92 providing communication between the interior of the cylinder and the interior of said valve-cage. These slots 92 lie adjacent the ledge 93 formed by the two different inside diameter portions of the valve-cage 92, said ledge, being beveled as shown.

The transverse or top wall of the cup-shaped valve cage 91 has a central opening communicating with the inside of a tubular extension 95 on the valve cage. Instead of being integral with the valve cage as shown, tube 95 may be secured in the central opening of the valve cage in any suitable manner. This tubular extension 95 is concentric with the cylinder 20 and extends upwardly into the cylinder a distance predetermined by the desired control of the approaching movements of the two relatively movable members to be effected by the shock absorber. The outside diameter of the tubular extension 95 is such that it will slidably enter the tubular body portion of the check valve 44 when the piston is moved a predetermined distance downwardly into the cylinder. The length of the tubular extension 95 is predetermined by the control to be desired. In some instances this length may be one-quarter of the entire stroke of the piston so that during the movement of the piston through its final quarter stroke downwardly the tubular extension 95 will be encompassed by the check valve 44 on the piston.

Figure 4:
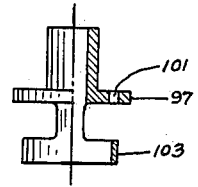
Fig. 4 is a detail view of one of the fluid flow control valves.

A guide pin 96 has its one end anchored in the clamping member 90 so as to be concentric with the tubular extension 95. The other end of the pin 96 extends beyond the upper end of said tubular extension 95. A check valve 97 is slidably carried by pin 96 and is yieldably urged upon the end of said tubular extension by a spring 98 abutting against a washer 99 held on the pin 96 by a cross pin 100. Valve 97 has an orifice 101 providing a constant communication between the interior of cylinder 20 and tubular extension 95. To help hold the pin 96 concentric with the tubular extension 95, valve 97 has an extension providing a ring portion 103 which slidably fits into the tubular extension and never moves out of the confines of said extension. Valve 97 is shown in detail in Fig. 4.

In the valve cage 91 there is slidably supported a cup-shaped pressure relief valve 105 which normally closes the slot openings 92 in said valve cage. The annular wall of valve 105, where it meets the transverse wall, is undercut to provide a ledge 106 against which fluid pressure may act to move the valve 105 against the effect of the comparatively heavy spring 107 which yieldably urges valve 105 so that its beveled edge, where the annular and transverse wall surfaces of the valve meet, engages with the beveled valve-seat 93 on the valve cage. Spring 107 seats upon the clamping member 90. Figs. 2 and 3 clearly show that the ledge 106 on the pressure relief valve 105 is constantly exposed to the fluid pressure in the slot openings 92 which communicate with the interior of the working cylinder 20.

The transverse wall of the pressure relief valve is centrally apertured as at 110, the inner surface of said transverse wall having an annular ridge 112 surrounding the opening 110 which forms a seat for the check valve 113 slidably carried on the guide pin 96. A spring 114, interposed between the valve 113 and the clamping member 90, yieldably urges said valve 113 into engagement with its seat 112. This spring 114 is of heavier construction than spring 98 which urges valve 97 against the annular edge of the tubular extension 95 so that valve 97 will be moved from its seat on said extension by fluid pressure in the tubular extension 95 before the valve 113 is moved from its seat 112 on the pressure relief valve.

A splash ring 115 is provided in the reservoir 22.

The shock absorber of the present invention is designed and constructed to provide a two stage control of fluid flow as the piston moves in down direction and a single stage of control as it moves in the up direction. When the shock absorber is installed upon a vehicle having a frame and body supported by springs that are secured to and carried by the axles of the vehicle, one moving part, for instance the piston rod, is attached to the body carrying frame of the vehicle termed the "sprung mass" and the other movable part of the shock absorber, the cylinder is attached to the axle of the vehicle, termed the "unsprung mass." The approaching movement of the sprung and unsprung masses is called the "compression movement" inasmuch as the springs of the vehicle are compressed during this movement. The opposite or separating movement of said masses is termed the "rebound movement" inasmuch as the vehicle springs rebound or return to their normal load positions during this movement. Thus this shock absorber has a two stage compression control and a single stage rebound control.

The first stage compression control takes place while the piston 40 is moving downwardly in the cylinder 20 and before the check valve 44 in the piston encompasses the tubular extension 95. For instance, when a wheel of the vehicle strikes an obstruction in the roadway it is thrust upwardly and thereby thrusts the axle upwardly causing a relative movement between the cylinder 20 and piston 40 of the shock absorber so that the piston moves from its normal load position in the cylinder toward the end member 80 of the cylinder. This causes pressure to be exerted upon the fluid in the cylinder beneath the piston. Intake valve 83 remains closed and heavily loaded pressure relief 105 will not be opened for the lightly loaded valve 56 will be moved from its seat 48 by this fluid pressure and permit a substantially unrestricted flow of fluid from the cylinder beneath the piston 40 through the piston passage 45 into the cylinder chamber surrounding the piston rod 27. All of the fluid displaced from beneath the piston 40 cannot be received by the cylinder chamber above the piston for the cubical contents of the cylinder chamber beneath the piston is greater than the cylinder chamber containing the piston rod 27. Therefore the fluid displaced by the piston rod, which, during this phase of shock absorber operation is substantially the sole fluid displacing means, is the fluid flow from the cylinder which is to be controlled. The first flow is established through the orifice 101 in valve 97 which provides a constant restriction. After passing through the orifice 101, the fluid is directed against the comparatively lightly loaded valve 113 which, when moved from its seat 112, will permit the fluid to flow through the openings 89 in the clamping member 90, openings 90a and 90b in the end member 80 and into the reservoir 22. The orifice 101 may function as the sole fluid flow controlling means within certain limits governed by the speed at which the piston 40 moves downwardly in the cylinder 20. If the speed of the piston movement exceeds a certain value the fluid displaced cannot be relieved or exhausted by the orifice alone and therefore the pressure relief valve 105 will become effective to assist the orifice in providing an additional controlled fluid flow from the cylinder. When a predetermined fluid pressure is reached in the cylinder, said pressure acting downwardly on the ledge 106 of the valve 105, will move said valve against the effect of the spring 107 and establish a restricted fluid flow through the now existing space between the beveled edge of the valve and the beveled surface valve-seat 93 this flow joining the fluid flowing from the orifice 101 and passing check valve 113 on its way through openings 107 and 91 to the reservoir 22.

Figure 11:
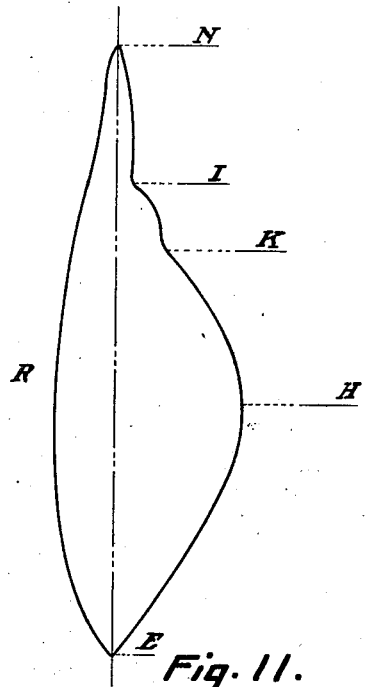
Fig. 11 is a pressure diagram of the shock absorber made under a certain phase of its operation.

The Fig. 11 is an operation curve made during one cycle of shock absorber operation. The point N shows the rest or normal position. As soon as the piston moves downwardly into the cylinder on the compression stroke the orifice 101 becomes effective. The curve portion N to I indicates the resistance to movement offered by the shock absorber. It will be noted that this portion of the curve rises gradually from zero to a certain point then flattens substantially and remains constant at this height indicating that the orifice is offering a substantially constant restriction to fluid flow. If the piston movement is such, however, that an excessive fluid pressure is built up, which cannot be relieved by the orifice 101, then the presssure relief valve 105 becomes effective. The quickly rising curve in the area I to K indicates that the spring loaded relief valve has become effective to provide its control of the fluid flow at greater pressures, said control varying in accordance with such fluid pressures.

At the point K in the curve the piston will have reached the position in its travel where the check valve 44 in the piston encompasses the tubular extension 95. This stops the flow of fluid directly from the cylinder chamber beneath the piston, through said check valve 44, past valve 56 and through piston passages 45 into the cylinder chamber above the piston. As a consequence the piston rod 27 no longer acts as the sole fluid displacement member but on the contrary the piston 40 also acts as a displacement member. Now the orifice 101 is no longer active as a fluid flow control device for the fluid under pressure of the piston rod and piston, is directed against the pressure relief valve 105 which is now the sole fluid flow control device. The curve rises steadily as illustrated in the area K to H, Fig. 11, due to the restriction to high pressure fluid flow offered by the heavily loaded pressure relief valve 105. Fluid flowing past valve 105 into the valve cage 91 will build up a pressure in said cage 91 and its tubular extension 95 which is directed against the valves 97 and 113. The spring 98 which urges valve 97 upon its seat is weaker than spring 114 which urges valve 113 upon its seat and therefore valve 97 will be lifted from its seat by fluid pressure before valve 113 so that fluid from cage 91 and its tubular extension will first flow past valve 97 into the interior of the piston and rod then past the lightly loaded valve 56 to charge the space above the piston with fluid. All of the fluid displaced by the piston cannot be received by the space above the piston for the rod 27 still acts as a displacement member and therefore the excess fluid, not capable of being forced into the space around the piston rod 27, will flow from the exhaust side of the pressure relief valve 105 past valve 113, which is now forced from its seat 112, through openings 89 and 90a and 90b into the reservoir 22. From this it may be seen that the space in the cylinder above the piston is filled with fluid forced from the exhaust side of the pressure relief valve 105 past valves 97 and 56 into said space, this supercharging effect being governed by the differential of spring loads on valves 97 and 113 the valve 97 leading to said space having a lighter spring load than the valve 113 leading to the reservoir.

As the piston slows up, approaching the end of its downward movement, pressures will correspondingly drop and thus the curve of Fig. 11 shows a gradual decline of the pressure from point H to zero at point E where the piston reverses the direction of its movement ending its compression stroke and starting its rebound stroke under the rebounding force of the vehicle spring.

As the piston moves upwardly it displaces fluid from the cylinder chamber above the piston to the chamber beneath the piston. The fluid pressure above the piston is exerted upon the portion of the beveled surface 62 of valve 55 extending beyond the valve seat 51 and moves the valve 55 off its seat against the effect of the spring 63. This establishes a fluid flow from the cylinder space above the piston into the interior of the piston 40 resulting in the movement of check valve 44 from its seat 49 to permit the fluid to enter the lower cylinder space. This fluid flow from the upper to the lower cylinder chamber is not sufficient completely to fill said lower space and therefore fluid will be taken from the reservoir 22 through the intake valve 83 and its passages 86 to compensate for this difference in capacity.

The only control of the fluid flow between the cylinder chamber above the piston and the cylinder chamber therebeneath is the spring loaded valve 55, which, varying its control in accordance with fluid pressures, will cause the shock absorber to provide a gradual resistance to rebound movements. As shown in the curve of Fig. 3 the rebound resistance gradually increases from zero to a certain maximum which is then more gradually reduced as the speed of the piston diminishes with the slowing rebound movement of the spring.

From the aforegoing it may be seen that the present shock absorber provides a two stage compression control. As the axle is slightly moved due to the road wheels of the vehicle striking small obstructions in the road over which the vehicle is being operated, fluid displaced by such slight movements of the movable parts of the shock absorber will be constantly controlled by the orifice 101. Should the movements of the shock absorber be of greater range and speed due to rougher roads being encountered, the pressure relief valve will assist the orifice in controlling the greater pressure fluid flow and thus provide an increased resistance being offered by the shock absorber. If extremely rough road beds are encountered and the shock absorber is actuated through its extreme range of movement then the second stage of compression control becomes effective for then the piston renders the orifice control ineffective and the pressure relief valve, acting in accordance with fluid pressures, is the sole fluid flow control device.

A single stage of control is offered by the shock absorber on the rebound movement said control starting and ending gradually.

While the embodiment of the present invention as herein disclosed, constitutes a preferred form, it is to be understood that other forms might be adopted, all coming within the scope of the claims which follow.

What is claimed is as follows:

1. A hydraulic shock absorber comprising in combination; a cylinder having a fluid discharge opening; fluid displacement means in said cylinder, said means comprising a piston provided with a passage for the transfer of fluid therethrough and a rod for reciprocating said piston; a valve normally closing said piston passage but adapted to establish a substantially unrestricted flow of fluid through said passage as the piston is moved in one direction; dual means for controlling the flow of fluid from the cylinder through the discharge opening, one being a fixed orifice the other a spring loaded valve adapted to become effective in response to a predetermined fluid pressure; and means cooperating with the piston when it reaches a predetermined point in its movement in said one direction, for rendering the orifice control ineffective.

2. A hydraulic shock absorber comprising in combination, a cylinder having a fluid discharge opening; fluid displacement means in said cylinder, said means comprising a piston provided with a passage for the transfer of fluid therethrough and a rod for reciprocating the piston; a spring loaded valve in the piston normally closing the piston passage but adapted to be actuated, as the piston moves in one direction, for establishing unrestricted flow of fluid through the piston whereby the piston rod becomes the main member for displacing fluid in the cylinder; dual means for controlling the flow of fluid through the discharge opening of the cylinder, one of said means being a fixed orifice adapted to control the discharge flow within certain limits, the other means being a spring loaded check valve adapted to control said discharge flow in accordance with the fluid pressure; and means coaxial of the cylinder, starting to cooperate with the piston at a predetermined point in its movement in said one direction in the cylinder, for discontinuing the free flow of fluid through the piston and thereby rendering effective also the piston as a means of fluid displacement and for rendering the orifice ineffective whereby the check valve provides the sole control of fluid displaced by the piston and rod.

3. A hydraulic shock absorber comprising in combination, a cylinder having a fluid discharge opening; fluid displacement means in said cylinder comprising a piston provided with a through passage and a piston rod; a valve mechanism normally closing said piston passage and adapted to permit a substantially unrestricted fluid flow through the piston as said piston is moved in one direction and establishing a more highly restricted fluid flow through the piston passage as the piston is moved in the opposite direction; dual means for controlling the flow of fluid from the cylinder through its discharge opening as the piston is moved in said one direction, one of said dual means being a fixed orifice, the other a spring loaded valve controlling the fluid flow in accordance with fluid pressure; and means starting to cooperate with the piston at a predetermined point in its movement in said one direction for rendering the orifice control ineffective and for restricting the fluid flow through the piston passage.

4. A hydraulic shock absorber comprising in combination, a cylinder having a fluid discharge opening at its one end; fluid displacement means in said cylinder comprising a piston and rod, said piston having a passage therethrough; means restricting fluid flow through said piston passage in one direction and permitting a substantially unrestricted flow in the other direction; dual means restricting fluid flow through the cylinder discharge opening, one providing a constant restriction, the other providing a variable restriction in accordance with fluid pressure; stationary means adapted to enter the piston passage at a predetermined point in the movement of the piston toward the discharge opening in the cylinder for rendering the constantly restricting means ineffective and maintaining effective only the variable restricting means and for restricting the flow of fluid through the piston passage as said piston is moved beyond said predetermined point in its movement toward the discharge opening in the cylinder.

5. A hydraulic shock absorber comprising in combination, a cylinder having a fluid discharge opening at its one end; fluid displacement means in said cylinder comprising a piston and rod, said piston having a passage therethrough; means restricting fluid flow through said piston passage in one direction and permitting a substantially unrestricted flow in the other direction; dual means restricting fluid flow through the cylinder discharge opening one being a constant flow orifice the other a spring loaded, pressure relief valve; tubular means adapted to cooperate with the piston only during a predetermined portion of its range of movement toward the discharge opening in the cylinder for rendering the orifice control ineffective and maintaining the pressure relief valve as the sole control of fluid displaced from the cylinder; a check-valve in series with the pressure relief valve for causing a portion of the fluid flowing from said relief valve to flow through the tubular means and the piston passage into the cylinder portion containing the piston rod; and a check valve in the tubular means for restricting the fluid flow therethrough.

6. A hydraulic shock absorber comprising in combination, a fluid reservoir; a cylinder; end members for the cylinder one having a central opening and providing an intake valve permitting fluid to flow only from the reservoir into the cylinder; a fluid displacement member in said cylinder, comprising a piston having a through passage and a piston rod slidably extending through the other cylinder end member; valve mechanism in the piston adapted to restrict fluid flow through the piston passage as the piston is moved upwardly, toward the rod supporting cylinder end member and adapted to permit a substantially unrestricted fluid flow through the piston as it is moved downwardly toward the end member providing the intake valve whereby the piston rod is the main means for urging fluid from the cylinder into the reservoir; a tubular member secured at one end in the central opening of the valved cylinder end member and extending coaxially into the cylinder a predetermined distance said tubular member having openings adjacent its point of attachment with the end member; a pressure relief valve normally closing said passages, said valve having a central opening; a check valve closing said central opening; an oriﬁced check valve seated upon the free end of the tubular member, said tubular member being adapted to enter the piston passage and render the piston as well as the rod effective as fluid displacement means after the piston has been moved through a predetermined initial portion of its range of movement.

7. A device in accordance with claim 6, in which however the check valves on the pressure relief valve and tubular member respectively are spring loaded, the check valve on the relief valve having the heavier spring load and thereby causing the check valve on the tubular member to open first.

8. A hydraulic shock absorber comprising in combination, a cylinder having a discharge opening at its one end; fluid displacement means in said cylinder comprising a piston having a passage for the transfer of fluid from one side of the piston to the other and a rod for reciprocating the piston; valve mechanism normally closing said piston passage and adapted, as the piston is moved upwardly away from the discharge opening in the cylinder, to restrict fluid flow through said piston passage and to permit a substantially unrestricted flow through said piston as it is moved in the opposite direction whereby substantially all fluid forced through the discharge opening of the cylinder is displaced by the piston rod; mechanism providing a two stage control for fluid displaced from the cylinder as the piston is moved in said opposite direction, the mechanism effective during the first stage control comprising a fixed orifice providing an initial, limited control of fluid flow and a spring loaded valve providing an added control in response to and accordance with fluid pressure, the second stage of control being effected only by the spring loaded valve, the orifice being rendered ineffective by the piston when said piston reaches a predetermined point in its movement in said opposite direction; and means for restricting the fluid flow through the piston passage and thereby rendering the piston as well as the rod effective as fluid displacement means during its continued movement from said predetermined point.

9. A hydraulic shock absorber comprising in combination, a cylinder having a discharge opening at its one end; fluid displacement means in said cylinder comprising a piston having a passage for the transfer of fluid therethrough and a rod for reciprocating said piston; a compound valve normally closing said piston passage said valve being adapted to establish a restricted fluid flow through the piston as it moves upwardly toward the closed end of the cylinder and adapted to permit a substantially unrestricted flow through the piston as it moves downwardly toward the discharge opening in the cylinder, thereby rendering the piston rod the main fluid displacement means during such downward movement; means for controlling the fluid flow through the discharge opening of said cylinder said means comprising a tubular valve housing anchored in said opening and having discharge ports adjacent its point of anchorage; a pressure relief valve normally closing said discharge ports but adapted in response to fluid pressure variably to restrict the flow of fluid displaced by the piston rod, a spring loaded, orificed valve engaging the end of the tubular housing opposite its anchorage, the orifice in said valve providing a fixed discharge port for fluid displaced by the piston rod; and means in the piston for encompassing the tubular housing at a predetermined point in the downward movement of the piston for rendering the orifice control ineffective and the pressure relief valve the sole control for the flow of fluid now displaced by the piston and the rod, the spring loaded valve on the tubular housing permitting a restricted flow into and through the piston passage to charge the space in the cylinder surrounding the piston rod.

10. A hydraulic shock absorber comprising in combination, a cylinder having a discharge opening at its one end; a fluid displacement member in said cylinder comprising a piston having a passage for the transfer of fluid therethrough and a rod for reciprocating said piston; a compound valve normally closing said piston passage said valve comprising telescopically engaging members, spring loaded to be urged in opposite directions, one member restricting fluid flow in one direction through the piston the other being adapted to be actuated to permit a substantially unrestricted fluid flow through the piston in the opposite direction; a fixed orifice providing a limited control of the flow of fluid through the discharge opening of the cylinder; a pressure relief valve providing a variable control of said flow from the cylinder in accordance with fluid pressure; and means cooperating with the piston after it has moved through an initial predetermined portion of its entire range of movement, for rendering the orifice control ineffective and for restricting the flow of fluid through the piston which flow has been unrestricted during said initial predetermined movement of the piston.

EDWIN F. ROSSMAN.